ABSTRACT

United States Patent [19]

Figure 1:
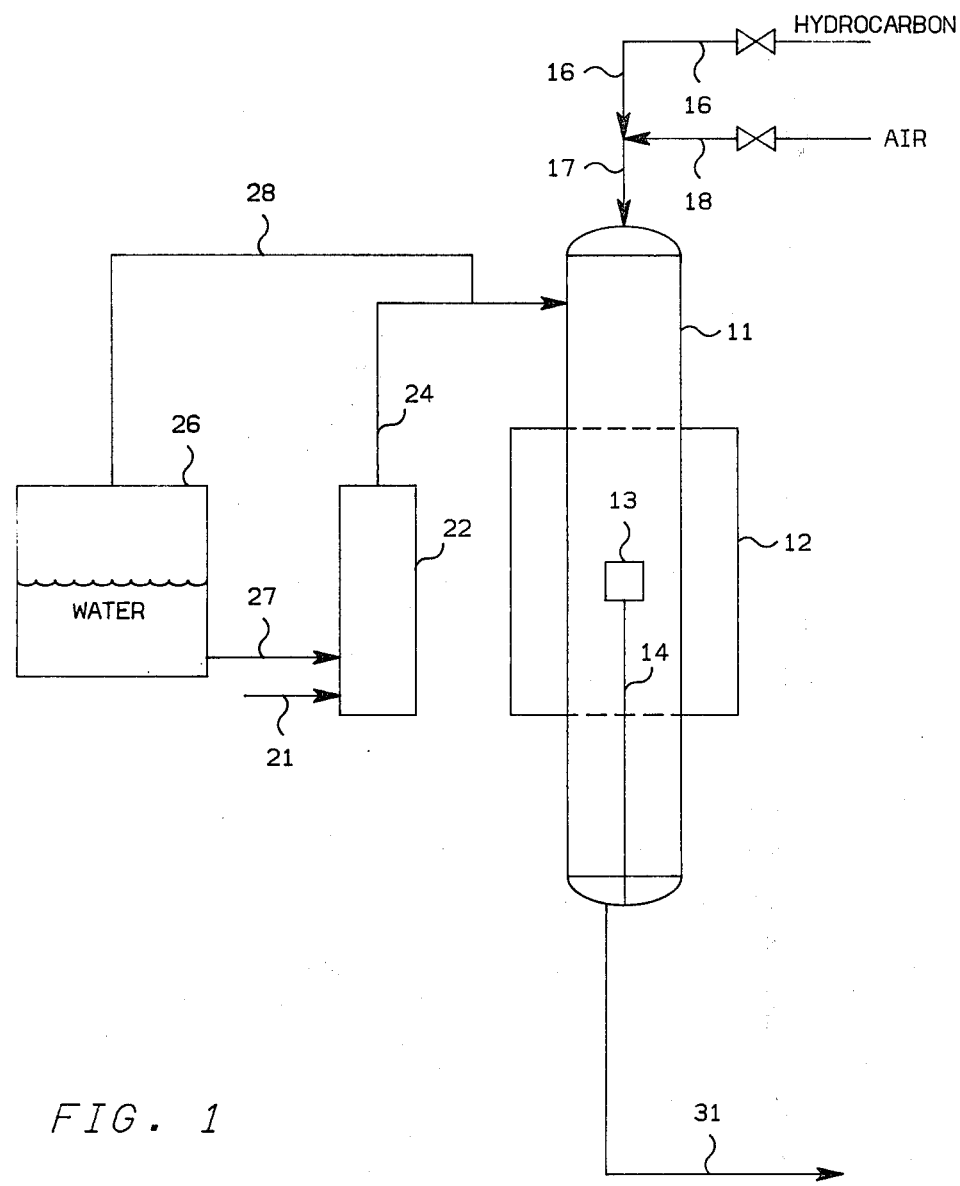

Kukes et al.

[11] 4,410,418

[45] Oct. 18, 1983

[54] METHOD FOR REDUCING CARBON FORMATION IN A THERMAL CRACKING PROCESS

[75] Inventors: Semyon Kukes; Jesse R. Harris; Randall A. Porter; Larry E. Reed, all of Bartlesville, Okla.

[73] Assignee: Phillips Petroleum Company, Bartlesville, Okla.

[21] Appl. No.: 363,739

[22] Filed: Mar. 30, 1982

[51] Int. Cl.³ .............................................. C10G 9/16
[52] U.S. Cl. ................................ 208/48 R; 585/950; 585/636; 422/241; 423/336
[58] Field of Search ..................... 208/48 R; 428/450; 427/397.7; 423/336, 335; 585/950, 636; 422/241

[56] References Cited

U.S. PATENT DOCUMENTS 2,575,141 11/1951 Smith-Johannsen ................. 428/450
2,715,060 8/1955 Barry .................................... 423/336
3,024,089 3/1962 Spencer et al. ...................... 423/336
3,170,865 2/1965 Allen et al. ......................... 208/48 R
3,704,333 11/1972 Spangler et al. .................. 208/48 R
4,099,990 7/1978 Brown et al. ....................... 428/450
4,105,821 8/1978 Blaich et al. ........................ 428/450

FOREIGN PATENT DOCUMENTS 2078699 1/1982 United Kingdom ................ 423/335

*Primary Examiner*—Delbert E. Gantz
*Assistant Examiner*—Cynthia A. Prezlock

[57] ABSTRACT

The formation of carbon on metals exposed to hydrocarbons in a thermal cracking process is reduced by contacting such metals with a halogen containing silicon compound selected from the group consisting of halogen containing silanes, halogen containing disilanes, and halogen containing siloxanes. After the metals are contacted with the halogen containing silicon compound, the halogen containing silicon compound is converted to silicon dioxide to form a protective coating on the metals. This protective coating substantially reduces the formation of carbon on metals exposed to hydrocarbons in a thermal cracking process.

9 Claims, 2 Drawing Figures

METHOD FOR REDUCING CARBON FORMATION IN A THERMAL CRACKING PROCESS

This invention relates to processes for the thermal cracking of a gaseous stream containing hydrocarbons. In one aspect this invention relates to a method for reducing the formation of carbon on the cracking tubes in furnaces used for the thermal cracking of a gaseous stream containing hydrocarbons and in any heat exchangers used to cool the effluent flowing from the furnaces.

The cracking furnace forms the heart of many chemical manufacturing processes. Often, the performance of the cracking furnace will carry the burden of the major profit potential to the entire manufacturing process. Thus, it is extremely desirable to maximize the performance of the cracking furnace.

In a manufacturing process such as the manufacture of ethylene, feed gas such as ethane and/or propane and/or naphtha is fed into the cracking furnace. A diluent fluid such as steam is usually combined with the feed material being provided to the cracking furnace. Within the furnace, the feed stream which has been combined with the diluent fluid is converted to a gaseous mixture which primarily contains hydrogen, methane, ethylene, propylene, butadiene, and small amounts of heavier gases. At the furnace exit this mixture is cooled, which allows removal of most of the heavier gases, and compressed.

The compressed mixture is routed through various distillation columns where the individual components such as ethylene are purified and separated. The separated products, of which ethylene is the major product, then leave the ethylene plant to be used in numerous other processes for the manufacture of a wide variety of secondary products.

The primary function of the cracking furnace is to convert the feed stream to ethylene and/or propylene. A semi-pure carbon which is termed "coke" is formed in the cracking furnace as a result of the furnace cracking operation. Coke is also formed in the heat exchangers used to cool the gaseous mixture flowing from the cracking furnace. Coke formation generally results from a combination of a homogeneous thermal reaction in the gas phase (thermal coking) and a heterogeneous catalytic reaction between the hydrocarbon in the gas phase and the metals in the walls of the cracking tubes or heat exchangers (catalytic coking).

Coke is generally referred to as forming on the metal surfaces of the cracking tubes which are contacted with the feed stream and on the metal surfaces of the heat exchangers which are contacted with the gaseous effluent from the cracking furnace. However, it should be recognized that coke may form on connecting conduits and other metal surfaces which are exposed to hydrocarbons at high temperatures. Thus, the term "Metals" will be used hereinafter to refer to all metal surfaces in a cracking process which are exposed to hydrocarbons and which are subject to coke deposition.

A normal operating procedure for a cracking furnace is to periodically shut down the furnace in order to burn out the deposits of coke. This downtime results in a substantial loss of production. In addition, coke is an excellent thermal insulator. Thus, as coke is deposited, higher furnace temperatures are required to maintain the gas temperature in the cracking zone at a desired level. Such higher temperatures increase fuel consumption and will eventually result in shorter tube life.

Another problem associated with carbon formation is erosion of the Metals, which occurs in two fashions. First, it is well known that in the formation of catalytic coke the metal catalyst particle is removed or displaced from the surface and entrained within the coke. This phenomenon results in extremely rapid metal loss and, ultimately, Metals failure. A second type of erosion is caused by carbon particles that are dislodged from the tube walls and enter the gas stream. The abrasive action of these particles can be particularly severe on the return bends in the furnace tube.

Yet another and more subtle effect of coke formation occurs when coke enters the furnace tube alloy in the form of a solid solution. The carbon then reacts with the chromium in the alloy and chromium carbide precipitates. This phenomena, known as carburization, causes the alloy to lose its original oxidation resistance, thereby becoming susceptible to chemical attack. The mechanical properties of the tube are also adversely affected. Carburization may also occur with respect to iron and nickel in the alloys.

It is thus an object of this invention to provide a method for reducing the formation of coke on the Metals.

In accordance with the present invention, a halogen containing silicon compound selected from the group consisting of halogen containing silanes, halogen containing disilanes and halogen containing siloxanes (members of this group of halogen containing silicon compounds are referred to hereinafter as a "silicon compound") is contacted with the Metals by pretreating the Metals with the silicon compound. The silicon compound contacted with the Metals is then converted to a protective coating of silicon dioxide on the Metals. The protective coating of silicon dioxide substantially reduces the formation of coke on the Metals which substantially reduces the adverse consequences which attend such coke formation.

Figure 2:
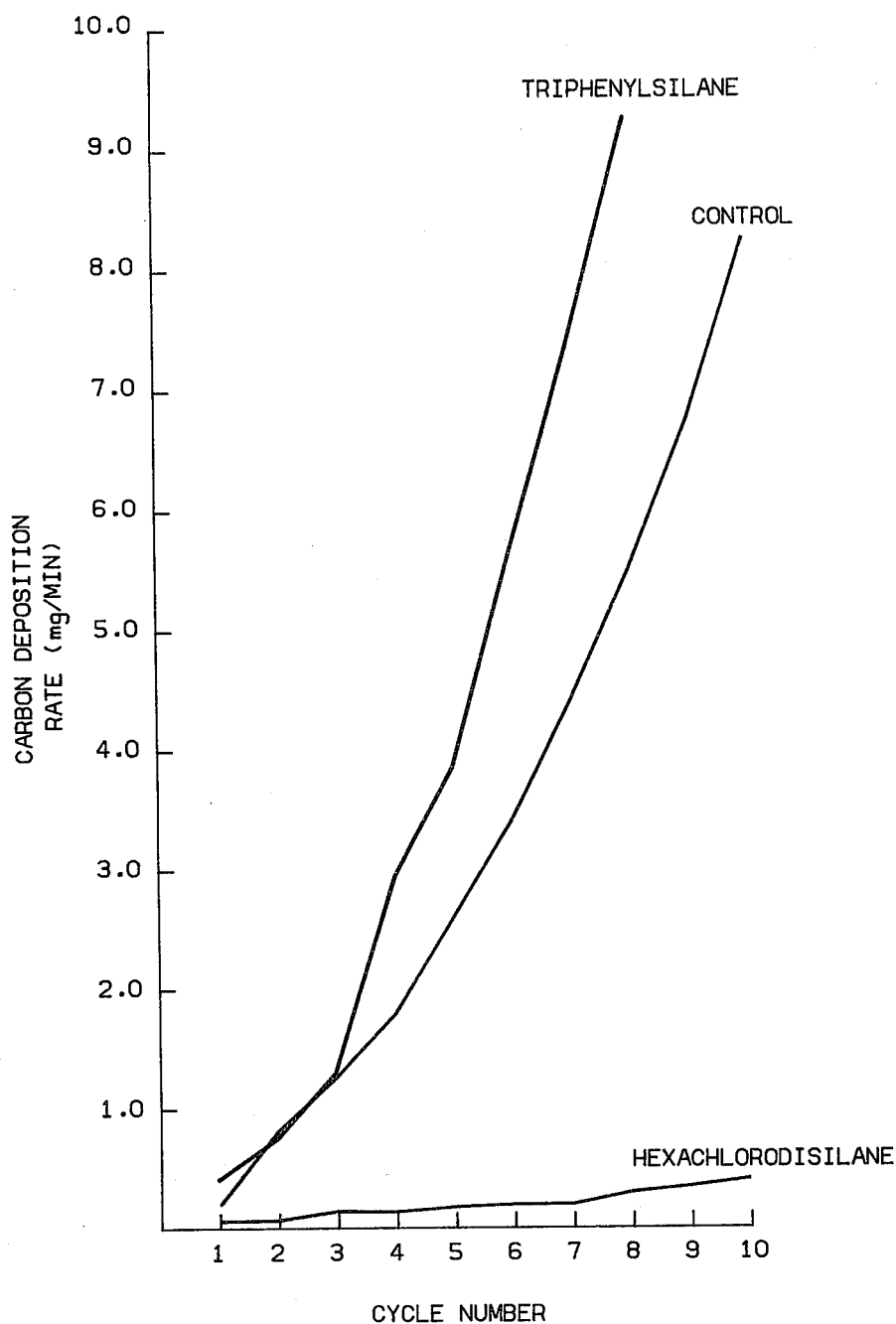

Other objects and advantages of the invention will be apparent from the foregoing brief description of the invention and the claims as well as the detailed description of the invention which follows:

A brief description of the drawings is as follows:

FIG. 1 is a diagrammatic illustration of the test apparatus used to conduct the test described in Example 1; and FIG. 2 is a graphical illustration of the results of the test conducted as described in Example 2.

The invention is described in terms of a cracking furnace used in a process for the manufacture of ethylene. However, the applicability of the invention described herein extends to other processes wherein a cracking furnace is utilized to crack a feed material into some desired components and the formation of coke on the walls of the cracking tubes in the cracking furnace or other metal surfaces associated with the cracking process is a problem.

Any suitable silicon compound may be contacted with the Metals in accordance with the present invention. Chlorine and bromine are the preferred halogens.

Halogen containing silanes which are suitable for use in the present invention are generally characterized by the formula $$R_n SiX_{4-n} \tag{1}$$

where R is a hydrocarbyl group or derivative, containing from 1 to 12 carbon atoms, or hydrogen, X is a halogen, and n=0 to 3. It is noted that formula 1 is a general formula and the silane may not contain an $R_n$. Examples of halogen containing silanes are silicon tetrachloride, tri-chloromethylsilane and chlorobis(methoxy)methylsilane.

Halogen containing disilanes which are suitable for use in the present invention are generally characterized by the formula

$$X_{3-p}R_p Si\text{-}SiR_m X_{3-m} \qquad (2)$$

where R and X are as previously defined for formula 1 and p and m are equal to 0, 1 or 2. It is again noted that formula 2 is general and the disilane may not contain the $R_p$ and $R_m$. Examples of suitable halogen containing disilanes are hexachlorodisilane ($Si_2Cl_6$) and symmetrical tetraethyldichlorodisilane (($C_2H_5$)$_2$ClSi-SiCl($C_2H_5$)$_2$).

Halogen containing siloxanes which are suitable for use in the present invention are generally characterized by the formula

$$X_{3-p}R_p Si\text{-}O\text{-}SiR_m X_{3-m} \qquad (3)$$

where R, X, m and p are as defined for formula 2. It is again noted that formula 3 is general and the $R_p$ and $R_m$ may not be present. An example of a suitable halogen containing siloxane is hexachlorosiloxane.

In general, any silicon compound may be used to reduce the buildup of coke on any of the high temperature steels. Commonly used steels in cracking tubes are Incoloy 800, Inconel 600, HK-40, 1¼ chromium-½ molybdenum steel, and Type 304 Stainless Steel. The composition of these steels in weight percent is as follows:

| STEEL | Ni | Cu | C | Fe | S | Cr | Mo | P | Mn | Si |
|---|---|---|---|---|---|---|---|---|---|---|
| Inconel 600 | 72 | .5 | .15 | 8.0 | | 15.5 | | | | |
| Incoloy 800 | 32.5 | .75 | .10 | 45.6 | | 21.0 | | 0.04max | | |
| HK-40 | 19.0–22.0 | | 0.35–0.45 | balance ≅ 50 | 0.40max | 23.0–27.0 | | | 1.5max | 1.75max |
| 1¼Cr–½Mo | | | | balance ≅ 98 | 0.40max | 0.99–1.46 | 0.40–0.65 | 0.035max | 0.36–0.69 | 0.13–0.32 |
| 304SS | 9.0 | | .08 | 72 | | 19 | | | | |

The silicon compound is contacted with the Metals by pretreating the Metals with the silicon compound. The silicon compound could be added to the hydrocarbon containing feedstock but it is presently not considered desirable to add the silicon compound to the hydrocarbon containing feedstock because the presence of halogen in the feedstock could cause undesirable corrosion at the temperatures present in a cracking process. Also, the silicon compound is generally susceptible to hydrolysis and polymerization. If the silicon compound is introduced in the feed, these reactions may occur before the silicon oxide reaches the tube wall and the product will be carried out of the reactor prematurely.

A preferred pretreatment method is to contact the Metals with the silicon compound by flooding the cracking tubes with the silicon compound. The silicon compound is allowed to remain in contact with the surface of the cracking tubes for any suitable length of time. A time of at least about one minute is preferred to insure that all of the surface of the cracking tube has been treated. The contact time would typically be about ten minutes or longer in a commercial operation. However, it is not believed that the longer times are of any substantial benefit other than to fully assure an operator that the cracking tube has been treated.

It is typically necessary to spray or brush the silicon compound on the Metals to be treated other than the cracking tubes but flooding can be used if the equipment can be subjected to flooding.

At least some of the silicon compounds such as hexachlorodisilane are liquid in form. For those silicon compounds which are liquid in form, use of the undiluted compound would be preferred to obtain maximum protection. However, it would not generally be economically feasible to use an undiluted silicon compound. Thus the silicon compound would generally be used in a diluted form.

Any suitable solvent may be used to form a solution of the silicon compound but care must be taken in selecting a solvent because the silicon compound is very reactive. The examples of suitable solvents are carbon tetrachloride, benzene, and carbon disulfide.

Any suitable concentration of the silicon compound in the solution may be utilized. It is desirable to use a concentration of at least 0.1 molar and concentrations may be 1 molar or higher with the strength of the concentration being limited by metallurgical and economic considerations. The presently preferred concentration of silicon compound in the solution is in the range of about 0.2 molar to about 0.5 molar.

The silicon compound can also be applied to the surfaces of the cracking tube by spraying or brushing when the surfaces are accessible but application in this manner has been found to provide less protection against coke deposition than flooding.

After the Metals have been contacted with the silicon compound, the Metals are exposed to moisture to convert the silicon compound to silicon dioxide. A convenient way of exposing the silicon compound to moisture is to expose the silicon compound to air containing moisture. The time of exposure and the temperature of the exposure should be sufficient to permit most of the hydrogen halide acid produced in the hydrolysis to be liberated before hydrocarbon pyrolysis is begun. Preferably, the air containing moisture flows through the cracking tube so as to remove the hydrogen halide acid before the temperature of the cracking furnace is raised to an operating range. Generally, the time of exposure will be in the range of about 1 minute to about 2 hours and the temperature will be in the range of about 20° C. to about 100° C. Absence of the readily detectable hydrogen halide acid in air flowing from the cracking furnace provides a convenient indication that the hydrolysis has been completed and that a coating of silicon dioxide is present on the Metals.

Steam is generally utilized as a diluent for the hydrocarbon containing feedstock flowing to the cracking furnace. The steam/hydrocarbon molar ratio is considered to have very little effect on the protective coating formed in accordance with the present invention. However, the steam/hydrocarbon molar ratio will generally not be allowed to exceed 2:1 because of economic considerations and a steam/hydrocarbon molar ratio in the range of about 0.25:1 to about 0.75:1 is particularly preferred.

The cracking furnace may be operated at any suitable temperature and pressure. In the process of steam cracking of light hydrocarbons to ethylene, the temperature of the fluid flowing through the cracking tubes increases during its transit through the tubes and will attain a maximum temperature at the exit of the cracking furnace of about 850° C. The wall temperature of the cracking tubes will be higher and may be substantially higher as an insulating layer of coke accumulates within the tubes. Furnace temperatures of nearly 2000° C. may be employed. Typical pressures for a cracking operation will generally be in the range of about 10 to about 20 psig at the outlet of the cracking tube.

Before referring specifically to Example 1, the laboratory apparatus used in Example 1 will be described by referring to FIG. 1 in which a 9 millimeter quartz reactor 11 is illustrated. A part of the quartz reactor 11 is located inside the electric furnace 12. A metal coupon 13 is supported inside the reactor 11 on a two millimeter quartz rod 14 so as to provide only a minimal restriction to the flow of gases through the reactor 11. A hydrocarbon feed stream (ethylene) is provided to the reactor 11 through the combination of conduit means 16 and 17. Air is provided to the reactor 11 through the combination of conduit means 18 and 17.

Nitrogen flowing through conduit means 21 is passed through a heated saturator 22 and is provided through conduit means 24 to the reactor 11. Water is provided to the saturator 22 from the tank 26 through conduit means 27. Conduit means 28 is utilized for pressure equalization.

Steam is generated by saturating the nitrogen carrier gas flowing through the saturator 22. The steam/nitrogen ratio is varied by adjusting the temperature of the electrically heated saturator 22.

The reaction effluent is withdrawn from the reactor 11 through conduit means 31. Provision is made for diverting the reaction effluent to a gas chromatograph as desired for analysis.

In determining the rate of coke deposition on the metal coupon, the quantity of carbon monoxide produced during the cracking process was considered to be proportional to the quantity of coke deposited on the metal coupon. The rationale for this method of evaluating the effectiveness of the method for forming a coating of silicon dioxide was the assumption that carbon monoxide was produced from deposited coke by the carbon-steam reaction. Metal coupons examined at the conclusion of cracking runs bore essentially no free carbon which supports the assumption that the coke had been gasified with steam.

The selectivity of the converted ethylene to carbon monoxide was calculated according to equation 1 in which nitrogen was used as an internal standard.

$$\% \text{ Selectivity (CO)} = \frac{(\text{mole } \% \text{ CO/mole } \% \text{ N}_2) \times 100}{\text{Conversion}} \quad (1)$$

The conversion was calculated according to equation 2.

$$\text{Conversion} = \frac{(\text{mole } \% \text{ C}_2\text{H}_4/\text{mole } \% \text{ N}_2)_{Feed} - (\text{mole } \% \text{ C}_2\text{H}_4/\text{mole } \% \text{ N}_2)_{sample}}{(\text{mole } \% \text{ C}_2\text{H}_4/\text{mole } \% \text{ N}_2)_{Feed}} \quad (2)$$

The CO level for the entire cycle was calculated as a weighted average of all the analyses taken during a cycle according to equation 3.

$$\text{Time Weighted Selectivity} = \frac{\Sigma \text{Selectivity} \times \text{Time}^i}{\Sigma \text{Time}^i} \quad (3)$$

The percent selectivity is directly related to the quantity of carbon monoxide in the effluent flowing from the reactor.

EXAMPLE 1

Incoloy 800 coupons, $1'' \times \frac{1}{4}'' \times 1/16''$, were employed in this example. Prior to the application of a coating, each Incoloy 800 coupon was thoroughly cleaned with acetone. The antifoulant was then applied by immersing the coupon for 1 minute in pure hexachlorodisilane that was blanketed with dry nitrogen. Upon removal from the hexachlorodisilane, the coupon was exposed to the atmosphere and the coupon coating liberated HCl. Within about 3 minutes, a white coating covered the coupon. The coated coupon was then warmed with a heat gun for about 2 minutes and then the foregoing treatment was repeated. A blank coupon, used for comparisons, was prepared by washing the coupon in acetone and heat treating in air at 700° C. for 1 minute without any coating.

The temperature of the quartz reactor was maintained so that the hottest zone was 900°±5° C. A coupon was placed in the reactor while the reactor was at reaction temperature.

A typical run consisted of three 20 hour coking cycles (ethylene, nitrogen and steam), each of which was followed by a 5 minute nitrogen purge and a 50 minute decoking cycle (nitrogen, steam and air). During a coking cycle, a gas mixture consisting of 73 mL per minute ethylene, 145 mL per minute nitrogen and 73 mL per minute steam passed downflow through the reactor. Periodically, snap samples of the reactor effluent were analyzed in a gas chromatograph. The steam/hydrocarbon molar ratio was 1:1.

Table I summarizes results of cyclic runs made with the treated and untreated Incoloy 800 coupons.

TABLE I

| | | Time Weighted Selectivity to CO | | |
|---|---|---|---|---|
| Run | Solution | Cycle 1 | Cycle 2 | Cycle 3 |
| 1 | None (Control) | 19.9 | 21.5 | 24.2 |
| 2 | Si$_2$Cl$_6$ | 2.7 | 2.3 | 2.6 |

As is illustrated in Table I, treatment of the Incoloy 800 coupon as described was effective to reduce the rate of carbon deposition by nearly a factor of 10 in comparison with the untreated control.

EXAMPLE 2

The rate of carbon deposition on Incoloy 800 coupons was measured using thermogravimetric analysis (TGA). A control coupon was prepared as set forth in Example 1. Also, a coupon was treated with hexachlorodisilane as set forth in Example 1. A third coupon was treated in an inert atmosphere with triphenylsilane by immersing the coupon in a solution of 1.3 grams triphenylsilane in 10 mL of normal hexane for 10 minutes. The coupon was then removed and placed in a muffle furnace at 700° C., in air, for several minutes.

The thus prepared coupons were exposed for 3 minute intervals to flowing propylene and the rate of carbon deposition was measured with a recording balance. These intervals were alternated with oxidative regeneration cycles that were 6 minutes long. Nitrogen only was used for 1 minute periods between the pyrolysis intervals and oxidative regeneration intervals to prevent mixing of air and propylene. A coking period and regeneration period together with the nitrogen purge periods is considered one cycle.

Before starting the TGA runs, the coupons were treated for several minutes with hydrogen at 700° C. and that temperature was not changed throughout the runs. Nitrogen flowed continuously at 260 mL per minute around the coupons. Propylene flowed at 40 mL per minute during the pyrolysis interval and air flowed at 65 mL per minute during the oxidative regeneration interval.

Results of the TGA measurements are set forth in Table II. Also, the results of the TGA measurements are plotted in FIG. 2.

TABLE II

| Cycle No. | Carbon Deposition - mg/minute | | |
|---|---|---|---|
| | Control | Triphenylsilane | Hexachlorodisilane |
| 1 | 0.21 | 0.42 | 0.07 |
| 2 | 0.81 | 0.78 | 0.07 |
| 3 | 1.25 | 1.29 | 0.15 |
| 4 | 1.81 | 2.95 | 0.13 |
| 5 | 2.61 | 3.87 | 0.18 |
| 6 | 3.38 | 5.63 | 0.20 |
| 7 | 4.38 | 7.35 | 0.22 |
| 8 | 5.50 | 9.25 | 0.30 |
| 9 | 6.75 | — | 0.36 |
| 10 | 8.25 | — | 0.40 |

In all runs, the rate of carbon deposition increased in each cycle. However, a substantial difference between the two silicon compounds was noted. Triphenylsilane treatment caused carbon deposition at a faster rate than the untreated control. In contrast, the Incoloy 800 coupon treated with hexachlorodisilane was much less reactive than the control and the relative difference increased substantially during the ten cycles.

Reasonable variations and modifications are possible by those skilled in the art within the scope of the described invention and the appended claims.

That which is claimed is:

1. A method for reducing the formation of coke on the metals which are contacted with a gaseous stream containing hydrocarbons in a thermal cracking process comprising the steps of:

contacting said metals with a halogen containing silicon compound selected from the group consisting of halogen containing silanes, halogen containing disilanes, and halogen containing siloxanes; and converting said halogen containing silicon compound to silicon dioxide to form a protective coating on said metals.

2. A method in accordance with claim 1 wherein said step of contacting said metals with said halogen containing silicon compound comprises contacting said metals with said halogen containing silicon compound when said gaseous stream is not in contact with said metals.

3. A method in accordance with claim 2 wherein said halogen containing silicon compound is in solution when contacted with said metals.

4. A method in accordance with claim 3 wherein said metals are contacted with said solution for at least about 1 minute and wherein the concentration of said halogen containing silicon compound in said solution is at least about 0.1 molar.

5. A method in accordance with claim 4 wherein the concentration of said halogen containing silicon compound in said solution is in the range of about 0.2 molar to about 0.5 molar.

6. A method in accordance with claim 3 wherein the solvent used to form the solution of said halogen containing silicon compound is selected from the group consisting of carbon tetrachloride, benzene and carbon disulfide.

7. A method in accordance with claim 1 wherein said step of converting said halogen containing silicon compound to silicon dioxide comprises exposing said halogen containing silicon compound to moisture.

8. A method in accordance with claim 7 wherein said step of exposing said halogen containing silicon compound to moisture comprises exposing said halogen containing silicon compound to air containing moisture.

9. A method in accordance with claim 7 wherein said halogen containing silicon compound is exposed to moisture for a time in the range of about 1 minute to about 2 hours and at a temperature in the range of about 20° C. to about 100° C.

* * * * *